(12) United States Patent
Grinberg et al.

(10) Patent No.: US 9,496,927 B1
(45) Date of Patent: Nov. 15, 2016

(54) INTERRUPT BASED NEAR FIELD COMMUNICATION (NFC) PAIRING

(71) Applicant: Google Inc., Mountain View, CA (US)

(72) Inventors: Dmitry Grinberg, Mountain View, CA (US); Erik Pasternak, Mountain View, CA (US)

(73) Assignee: Google Inc., Mountain View, CA (US)

( * ) Notice: Subject to any disclaimer, the term of this patent is extended or adjusted under 35 U.S.C. 154(b) by 579 days.

(21) Appl. No.: 13/746,081

(22) Filed: Jan. 21, 2013

(51) Int. Cl.
*H04B 5/00* (2006.01)

(52) U.S. Cl.
CPC .................................. *H04B 5/0093* (2013.01)

(58) Field of Classification Search
USPC .......... 455/41.1, 41.2; 340/10.1, 10.3, 10.51, 340/539.11
See application file for complete search history.

(56) References Cited

U.S. PATENT DOCUMENTS

| | | | |
|---|---|---|---|
| 2008/0143487 A1 | 6/2008 | Hulvey | |
| 2009/0146796 A1* | 6/2009 | Goto et al. | 340/10.51 |
| 2009/0170431 A1* | 7/2009 | Pering et al. | 455/41.1 |
| 2010/0021176 A1* | 1/2010 | Holcombe et al. | 398/115 |
| 2010/0214079 A1 | 8/2010 | Desjeux | |
| 2010/0277283 A1* | 11/2010 | Burkart et al. | 340/10.3 |
| 2010/0277286 A1* | 11/2010 | Burkart et al. | 340/10.34 |
| 2011/0068987 A1* | 3/2011 | Carr | 343/741 |
| 2011/0070826 A1* | 3/2011 | Griffin et al. | 455/41.1 |
| 2011/0070827 A1* | 3/2011 | Griffin et al. | 455/41.1 |
| 2011/0210926 A1* | 9/2011 | Pasquero et al. | 345/173 |
| 2011/0227704 A1* | 9/2011 | Padmanabhan et al. | 340/10.1 |
| 2012/0007723 A1 | 1/2012 | Whitaker et al. | |
| 2012/0077593 A1* | 3/2012 | Sarmenta | 463/40 |
| 2012/0242455 A1* | 9/2012 | Hale et al. | 340/10.1 |

(Continued)

FOREIGN PATENT DOCUMENTS

| | | |
|---|---|---|
| CN | 201662817 | 12/2010 |
| IN | 01544DE2011 | 8/2011 |

OTHER PUBLICATIONS

Latuske, "Stollmann and ARS Software to Develop Bluetooth and NFC Reference Solution", ARS Software GmbH, Jun. 28, 2011, 3 pgs.

(Continued)

*Primary Examiner* — Nay A Maung
*Assistant Examiner* — Erica Fleming-Hall
(74) *Attorney, Agent, or Firm* — Shumaker & Sieffert, P.A.

(57) ABSTRACT

A method and system for interrupt based NFC pairing is provided. In a passive NFC tag comprising a primary coil and a secondary coil, an electrical signal may be generated in the secondary coil when an NFC reader energizes one or both of the primary and/or secondary coils. The generated electrical signal may be filtered to remove any undesirable signal components such as noise. An interrupt signal, which may initiate pairing, may be generated based on the generated electrical signal. An NFC tag identifier, which comprises an address of the remote control, may be communicated from the NFC tag to the NFC reader and this may initiate the pairing on the NFC reader. The communicated NFC tag identifier may be utilized by the NFC reader for the pairing. The NFC tag identifier may be over-written with a new NFC tag identifier and the new NFC tag identifier may be locked.

17 Claims, 4 Drawing Sheets

(56) References Cited

U.S. PATENT DOCUMENTS

2013/0038278 A1* 2/2013 Park et al. .................. 320/108
2013/0078922 A1* 3/2013 Griffin et al. ............... 455/41.1
2013/0200162 A1* 8/2013 Dokai et al. ................. 235/492
2013/0221109 A1* 8/2013 Kaga ........................... 235/492

OTHER PUBLICATIONS

"Bluetooth Secure Simple Pairing Using NFC", NFC Forum and Bluetooth SIG, Inc., Oct. 18, 2011, 32 pgs.
"Bluetooth pairing without user confirmation", Stack Overflow [online]. May 4, 2011. Retrieved from the Internet: <http://stackoverflow.com/questions/5885438/bluetooth-pairing-without-user-confirmation> 4 pgs.
"Setting up a Bluetooth Connection", Nokia Symbian3 Developers Library v1.1. Jan. 11, 2011, 3 pgs.
YouTube, "Stollmann: Bluetooth Secure Simple Pairing via NFC #2", Jul. 14, 2011 Retrieved from the Internet: (https://www.youtube.com/watch?v=KWZz3o04mo> 3 pgs.
"WirelessMoves", mobilesociety [online]. Updated Nov. 24, 2008. Retrieved from the Internet: <http://mobilesociety.typepad.com/mobile_life/bluetooth/> 3 pgs.
Scarfone et al., "Guide to Bluetooth Security", National Institute of Standards and Technology, Computer Security Division, Sep. 2008, 43 pgs.

* cited by examiner

INTERRUPT BASED NEAR FIELD COMMUNICATION (NFC) PAIRING

REFERENCE

Not Applicable.

FIELD

Certain embodiments of the disclosure relate to wireless communication. More specifically, certain embodiments of the disclosure relate to a method and system for interrupt based NFC pairing.

BACKGROUND

In some conventional systems, to securely pair two devices over, for example, WiFi or Bluetooth, a shared secret or a mechanism to trigger a short time-based pairing may be utilized. Traditionally, this is done by typing in a number or using a button on both devices to trigger the pairing.

One of the devices that is being paired may be a very simple remote control which may possess no way to enter a number and so it needs to provide the secret through another method. Good security typically requires a writeable NFC tag or the use of a full NFC stack installed on both sides. The use of a full NFC stack installed on both sides enables both sides to agree on a secret prior to pairing and this may be more difficult technically as well as more expensive, especially for a low-complexity device such as the remote control. In the case of a writeable NFC tag on the remote, the secret must be updated on a regular basis to prevent brute force hacking. It also requires the use of a more capable NFC tag and a processor that wakes up and generates a code frequently. This approach utilizes more power.

A button to trigger initiation and synchronization of pairing is common, but for a minimal design associated with a device such as remote control, the addition of a special pairing button may not be feasible for a number of reasons. A passive NFC tag may be used to discover devices but does not provide security since the shared secret never changes and could be brute forced hacked or scanned once and then re-used at any point in the future. Writeable NFC tags allow the shared secret to be changed but require more software and more power, which is less ideal in a battery powered system such as a remote control.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method is provided for interrupt based NFC pairing, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Certain embodiments of the disclosure may be found in a method and system for interrupt based NFC pairing. Various embodiments of the disclosure provide a low-cost, buttonless implementation that does not require a user to type anything in. Since the implementation is buttonless, no dedicated pairing button is required for a device with low-complexity and minimal design such as a remote control. In various embodiments of the disclosure, a passive NFC tag is written with the address of a remote control. Around the NFC tag, there is a second coil (secondary coil) that is designed to be activated at the same time as the NFC tag. This may comprise, for example, two output pins that may be coupled to a filter circuit and passed to an interrupt pin of a microcontroller or processor in the remote control. This enables triggering when the NFC tag is read and entering pairing mode to do time based pairing on the remote without the need for a button. The other side, which may utilize a full NFC reader, the information from the NFC tag may be utilized to enter pairing mode and find the remote at the same time. This keeps the code much simpler and is cheaper and lower power than a writable NFC tag. This may be viewed as a form of tap to pair.

In various embodiments of the disclosure, in first device comprising a passive NFC tag having a primary coil and a secondary coil, an electrical signal may be generated in the secondary coil when a NFC reader in a second device energizes one or both of the primary and/or secondary coils. The generated electrical signal may be filtered to remove any undesirable signal components such as noise. An interrupt signal may be generated by a processor within the first device based on the generated electrical signal. The interrupt signal may be utilized to initiate pairing on the first device. An NFC tag identifier, which comprises the address of the remote control, may be communicated from the NFC tag to the first device and this may initiate the pairing on the first device. The communicated NFC tag identifier may be utilized by the second device for the pairing. The NFC tag identifier which comprises the address of the remote control may be over-written with a new NFC tag identifier or address and the new NFC tag identifier or address may be locked. An interrupt service routine may be executed based on the generated interrupt signal. The interrupt service routine may initiate the pairing on the first device.

Figure 1:
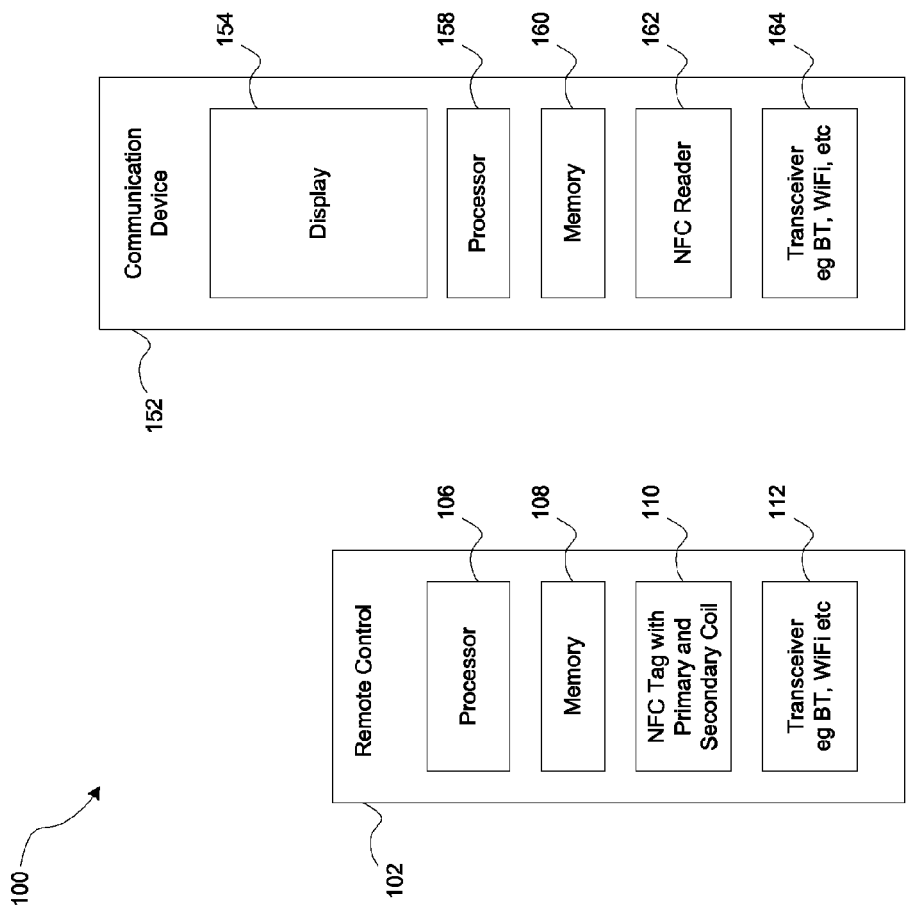
FIG. 1 is a block diagram of an example system for interrupt based pairing, in accordance with an embodiment of the disclosure.

FIG. 1 is a block diagram of an example system for interrupt based pairing, in accordance with an embodiment of the disclosure. Referring to FIG. 1, there is shown a system 100, which comprises a remote control 102 and a communication device 152. The remote control 102 comprises a processor 106, a memory 108, a NFC tag with primary and secondary coils 110 and a transceiver 112. The communication device 152 may comprise a display 154, a processor 158, a memory 160, and a NFC reader 162 and a transceiver 164.

The remote control 102 may comprise suitable logic, circuitry, interfaces and/or code that may be operable to control one or more device such as a television, a set-top box (STB), a monitor, a tablet, a DVR, a cellphone, a multimedia playback device or other similar type of device. The STB may comprise a cable or a satellite STB.

The processor 106 may comprise suitable logic, circuitry, interfaces and/or code that may be operable to control one or more operations or functions of the remote control 102. In this regard, the processor 106 may be operable to receive and process signals for the NFC tag with primary and secondary coils 110 and/or the transceiver 112. In accordance with an embodiment of the disclosure, the processor may comprise one or more dedicated and/or programmable I/O pins that may be operable to receive a signal that may be generated from a secondary coil within the remote control 102. The dedicated I/O pin may be referred to as an interrupt pin. The signal generated from the secondary coil and received at the I/O pins may be utilized to generate an interrupt to the processor 106. This generated interrupt may be utilized to place the remote control in a pairing mode. In this regard, the remote control 102 may be paired with one or more other devices such as the communication device 102, over one or more wireless technologies handled by the transceiver 164.

The memory 108 may comprise suitable logic, circuitry, interfaces and/or code that may be operable to store one or more settings, configuration, and/or operating code and/or data for the remote control 102. The memory 108 may be operable to store a corresponding NFC tag identifier (ID) for the NFC tag with primary and secondary coils 110. The NFC tag ID comprises an address of the remote control 102.

The NFC tag with primary and secondary coils 110 may comprise suitable logic, circuitry, interfaces and/or code that may be operable to communicate utilizing NFC technology. In this regard, a primary coil within the NFC tag with primary and secondary coils 110 may be energized by a NFC reader such as the NFC reader in the communication device 152. In one embodiment of the disclosure, whenever the primary coil is energized, this may cause a current to be induced in the secondary coil, thereby causing a signal to be communicated from the secondary coil to the I/O pins or interrupt pins of the processor 106. In another embodiment of the disclosure, whenever the primary coil is energized, the secondary coil may be concurrently energized, thereby causing a signal to be communicated from the secondary coil to the I/O pins or interrupt pins of the processor 106. The NFC tag with primary and secondary coils 110 may comprise a passive NFC tag.

The transceiver 112 may comprise suitable logic, circuitry, interfaces and/or code that may enable the remote control to communicate with one or more other devices such as the communication device 152. In accordance with various embodiments of the disclosure, the transceiver 112 may be operable to utilize one or more wireless communication technologies such as Bluetooth, WiFi including all variants thereof (802.11 a/b/g/n/e etc).

The communication device 152 may comprise suitable logic, circuitry, interfaces and/or code that may be operable to communicate with and/or controlled by the remote control 102. The communication device 152 may comprise a television, the set-top box (STB), the monitor, the tablet, DVR, the cellphone, the multimedia payback device or other similar type of device.

The display 154 may comprise suitable logic, circuitry, interfaces and/or code that may be operable to display control information and/or multimedia information such as content. The display 152 may be a LCD or a LED display, or variants thereof.

The processor 158 may comprise suitable logic, circuitry, interfaces and/or code that may be operable to control one or more operations or functions of the communication device 152. In this regard, the processor 158 may be operable to receive and process signals from and/or for the display 154, the NFC reader 162 and the transceiver 164. In accordance with an embodiment of the disclosure, the processor 158 may be operable to place the communication device 152 in a pairing mode, which enables the communication device 152 to be paired with the remote control over one or more wireless technologies handled by the transceiver 164.

The memory 160 may comprise suitable logic, circuitry, interfaces and/or code that may be operable to store one or more settings, configuration, and/or operating code and/or data for the remote control 102. The memory 108 may be operable to store a corresponding NFC tag (ID) which is receive from the NFC tag with primary and secondary coils 110 during pairing.

The NFC reader 162 may comprise suitable logic, circuitry, interfaces and/or code that may be operable to communicate utilizing NFC technology. In this regard, whenever the NFC reader 162 is brought within operating proximity of the NFC tag with primary and secondary coils 110, a primary coil and/or secondary coil within the NFC tag with primary and secondary coils 110 may be energized by the NFC reader 162 in the communication device 152. In one embodiment of the disclosure, whenever the secondary coil is energized, this may cause a signal to be communicated from the secondary coil to the I/O pins or interrupt pins of the processor 106.

The transceiver 164 may comprise suitable logic, circuitry, interfaces and/or code that may be operable to enable the communication device 152 to communicate with one or more other devices such as the remote control 102. In accordance with various embodiments of the disclosure, the transceiver 164 may be operable to utilize one or more wireless communication technologies such as Personal Area Networks (PANs) such as Bluetooth or ZigBee, and WiFi including all variants thereof (802.11 a/b/g/n/e etc).

In operation, the secondary coil in the NFC tag within the remote control 152 may be energized whenever the NFC reader 162 in the communication device 152 is brought within operating proximity of the NFC tag with primary and secondary coils 110 within the remote control 102. Once the secondary coil in the NFC tag with primary and secondary coils 110 is energized, this may generate a signal to the processor 106, which causes an interrupt to the processor 106 in the remote control 102. The interrupt may cause the remote control 102 to enter pairing mode, which enables the remote control 102 to be paired with the communication device 152.

Figure 2:
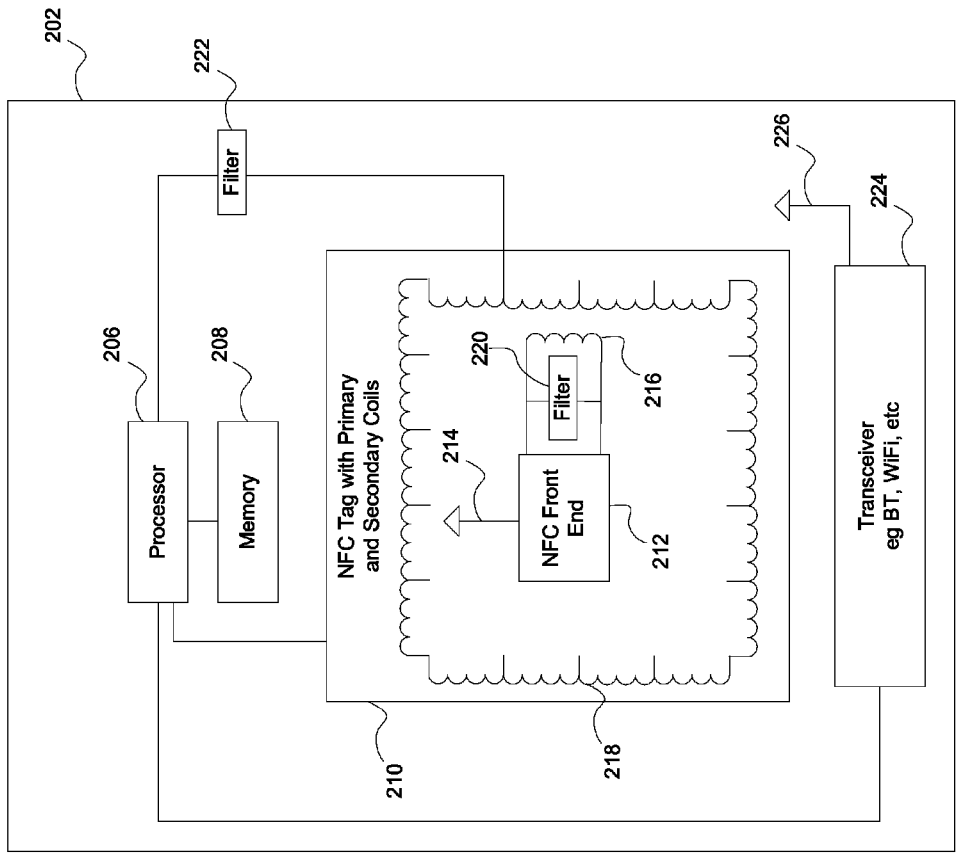
FIG. 2 is a block diagram illustrating an example remote control with primary and secondary coils that enables pairing, in accordance with an embodiment of the disclosure.

FIG. 2 is a block diagram illustrating an example remote control with a primary and a secondary coil that enables pairing, in accordance with an embodiment of the disclosure. Referring to FIG. 2, there is shown a FIG. 200 comprising a remote control with a primary and a secondary coil 202. The remote control with a primary and a secondary coil 202 may comprise a processor 206, a memory 208, a NFC tag with primary and secondary coils 210, a filter 222 and a transceiver 224. The NFC tag with primary and secondary coils 210 may comprise a NFC front end 212, an antenna 214, a primary coil 216, a secondary coil 218, and a filter 220. The transceiver 224 may comprise and antenna 226.

The processor 206 may comprise suitable logic, circuitry, interfaces and/or code that may be operable to control one or more operations or functions of the remote control 102. The processor 206 may be substantially similar to the processor 106, which is described with respect to FIG. 1.

The memory 208 may comprise suitable logic, circuitry, interfaces and/or code that may be operable to store one or more settings, configuration, and/or operating code and/or data for the remote control 102. The memory 108 may be operable to store a corresponding NFC tag identifier (ID) for the NFC tag with primary and secondary coils 110. The memory 208 may be substantially similar to the memory 108, which is described with respect to the FIG. 1.

The NFC front end 212 may comprise suitable logic, circuitry, interfaces and/or code that may be operable to handle analog communication for the remote control with the primary and the secondary coil 202.

The antenna 214 may be communicatively coupled to the NFC front-end 212.

The primary coil 216 may comprise suitable logic, circuitry, and/or interfaces that may enable a current to be induced within the primary coil 216 whenever the communication device 152 with the NFC reader 162 is brought within operating proximity of the remote control with the primary and the secondary coil 202. The primary coil 216 may be utilized to power up the NFC front-end 212 whenever the primary coil 216 is energized.

The secondary coil 218 may comprise suitable logic, circuitry, and/or interfaces that may enable a current to be induced within the secondary coil 218 whenever the communication device 152 with the NFC reader 162 is brought within operating proximity of the remote control with the primary and the secondary coil 202. In one embodiment of the disclosure, the primary coil 216 and the secondary coil 218 may be concurrently energized whenever the communication device 152 with the NFC reader 162 is brought within operating proximity of the remote control with the primary and the secondary coils 202. The secondary coil may be arranged so that it surrounds the NFC tag with primary and secondary coils 210. This may ensure that the primary coil 216 and the secondary coil 218 are concurrently energized by the NFC reader 162. In another embodiment of the disclosure, the secondary coil 218 may be energized by the induction of a current in the primary coil 216. The energized secondary coil 218 may be utilized to generate an interrupt to the processor 206 and this may cause the remote control with the primary and the secondary coils 202 to enter a pairing mode.

The filter 220 may comprise suitable circuitry, logic and/or code that may be operable to remove or filter out any undesired signals that may be generated by the NFC front-end 212. The filter 220 may be coupled to the NFC front-end 212 and the primary coil 216.

The filter 222 may comprise suitable circuitry, logic and/or code that may be operable to remove or filter out any undesired signals that may be generated by the secondary coil 218. The filter 222 may be coupled to an output of the secondary coil 218 and the I/O input pins of the processor 206.

The transceiver 224 may comprise suitable logic, circuitry, interfaces and/or code that may be operable to enable the communication device 152 to communicate with one or more other devices such as the remote control 102. The transceiver 224 may be substantially similar to the transceiver 164. The antenna 226 may be communicatively coupled to the transceiver 224.

In operation, in one embodiment of the disclosure, the communication device 152 may initiate the pairing process whenever the communication device 152 with the NFC reader 162 is brought within operating proximity of the remote control with the primary and the secondary coil 202. In another embodiment of the disclosure, the pairing process may be initiated by touching the communication device 152 and the remote control with the primary and the secondary coil 202. This may be referred to as touch-to-pair. Notwithstanding, once the communication device 152 with the NFC reader 162 is brought within operating proximity of the remote control with the primary and the secondary coil 202, a current may be concurrently induced in the primary coil 216 and the secondary coil 218. When the primary tag 216 is energized, the resulting energy may be utilized to power the NFC tag with primary and secondary coils 210 including the NFC front-end 212. The NFC tag with primary and secondary coils 210 may communicate its corresponding NFC tag ID to the NFC reader 162. The NFC reader 162 may enter pairing mode when it receives the NFC tag ID. Once the secondary coil 218 is energized, the resulting signal generated in the secondary coil 218 may cause an interrupt signal to be generated at the corresponding I/O pins of the processor 206. The corresponding interrupt service routine executed by the processor 206 may initiate a pairing process in the remote control with a primary and a secondary coil 202. In this regard, the remote control with a primary and a secondary coil 202 may enter the pairing mode.

Figure 3:
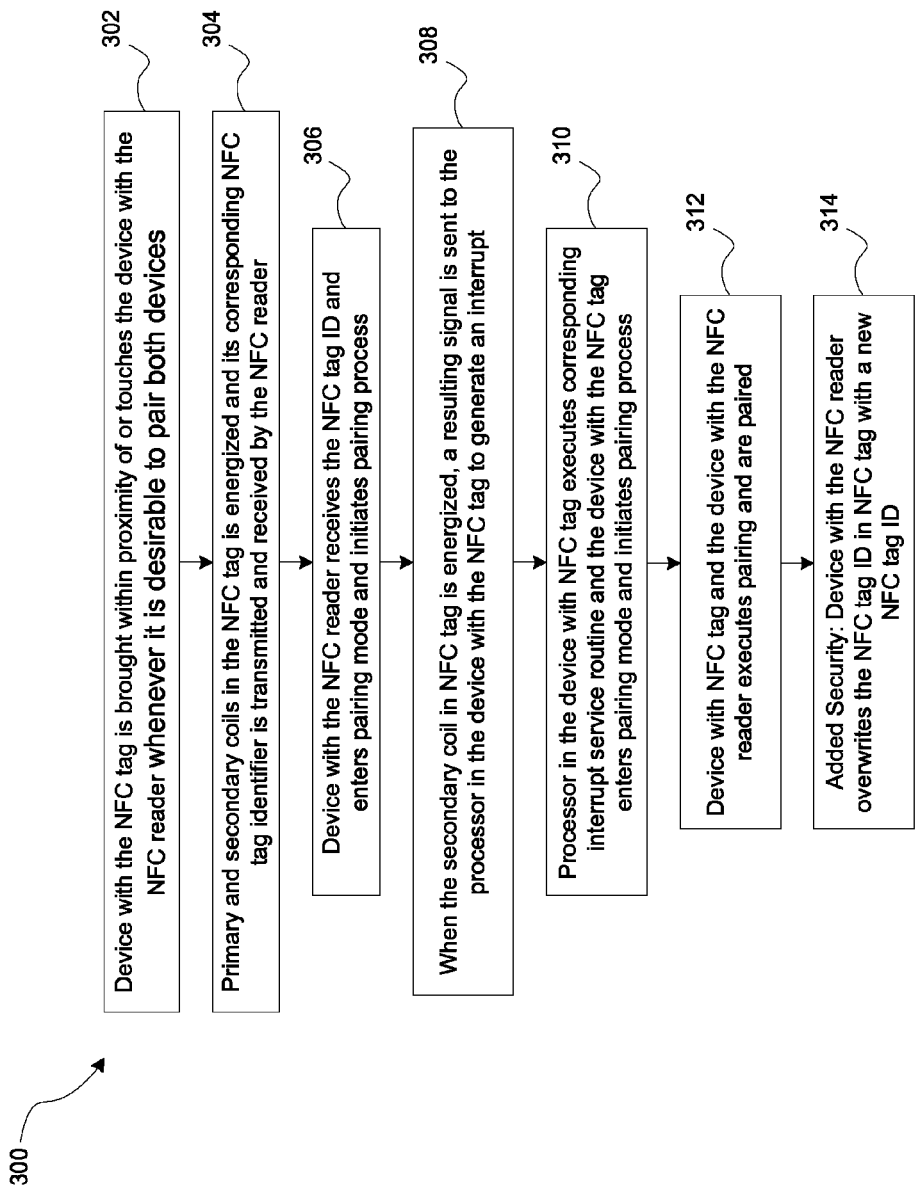
FIG. 3 is a flowchart illustrating example steps that may be utilized for interrupt based pairing, in accordance with an embodiment of the disclosure.

FIG. 3 is a flowchart illustrating example steps that may be utilized for interrupt based pairing, in accordance with an embodiment of the disclosure. Referring to FIG. 3, there is shown a flow chart 300. The example steps start with step 302 in which a device with the NFC tag is brought within operating proximity of or touches the device with the NFC reader whenever it is desirable to pair both devices. In step 304, the primary and secondary coils in the NFC tag are concurrently energized and the corresponding NFC tag identifier, which comprises the address of the remote control, is transmitted to the NFC reader. In step 306, the device with the NFC reader receives the NFC tag identifier, enters pairing mode and initiates the pairing process. In step 308, when the secondary coil in the NFC tag is energized, a resulting signal is sent to the processor in the device with the NFC tag to generate an interrupt.

In step 310, the processor in the device with the NFC tag executes a corresponding interrupt service routine and the device with the NFC tag enters a pairing mode and initiates the pairing process. In step 312, the device with the NFC tag and the device with the NFC reader executes pairing and are paired. In step 314, which may be an optional step, for added security, the device with the NFC reader may overwrite the NFC tag ID with a new NFC tag ID, which comprises a new address for the remote control.

Figure 4:
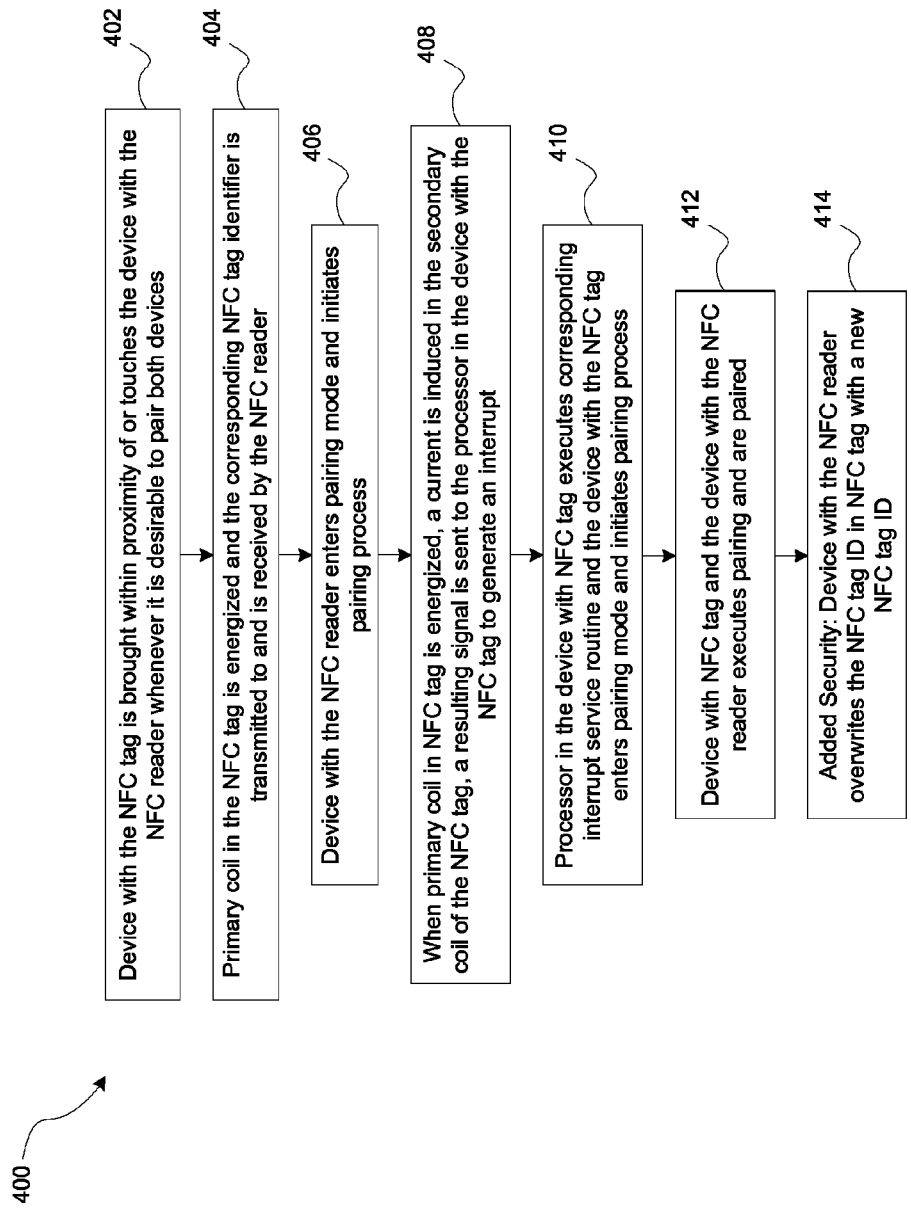
FIG. 4 is a flowchart illustrating example steps that may be utilized for interrupt based pairing, in accordance with an embodiment of the disclosure.

FIG. 4 is a flowchart illustrating example steps that may be utilized for interrupt based pairing, in accordance with an embodiment of the disclosure. Referring to FIG. 4, there is shown a flow chart 400. The example steps start with step 402 in which a device with the NFC tag is brought within operating proximity of or touches the device with the NFC reader whenever it is desirable to pair both devices. In step 404, the primary coil in the NFC tag is energized and the corresponding NFC tag identifier, which comprises the address of the remote control, is transmitted to and is received by the NFC reader. In step 406, the device with the NFC reader enters pairing mode and initiates the pairing process. In step 408, when primary coil in the NFC tag is energized, a current is induced in the secondary coil in the NFC tag, and a resulting signal is sent to the processor in the device with the NFC tag to generate an interrupt.

In step 410, the processor in the device with the NFC tag executes a corresponding interrupt service routine and the device with the NFC tag enters a pairing mode and initiates the pairing process. In step 412, the device with the NFC tag and the device with the NFC reader execute pairing and are paired. In step 414, which may be an optional step, for added security, the device with the NFC reader may overwrite the NFC tag ID with a new NFC tag ID, which comprises a new address for the remote control.

Various example embodiments of the disclosure provide a method and system for interrupt based pairing. A device such as a remote control 202, may comprise an NFC tag 210. The NFC tag 210 may comprise a primary coil 216 and a secondary coil 218. An electrical signal may be generated in the secondary coil 218 when one or both of the primary coil 216 and the secondary coil 218 are energized by an NFC reader 162. The generated electrical signal may be filtered by the filter 222 to remove any undesirable signal components such as noise. The NFC tag 210 may be a passive NFC tag. An interrupt signal may be generated by the processor 206 based on the generated electrical signal. The generated interrupt signal may be utilized by the processor 206 to initiate pairing. An interrupt service routine may be executed by the processor 206 based on the generated interrupt signal. The interrupt service routine may initiate the pairing on the device with the NFC tag 210.

An NFC tag identifier may be communicated from the NFC tag to the NFC reader. The communicating of the NFC tag identifier and the reception of the NFC tag by the NFC reader initiates the pairing on the device with the NFC reader 162. The communicated NFC tag identifier may be utilized by the device with the NFC reader 162 for the pairing. The pairing may occur over one or more wireless technologies, for example, Bluetooth. The NFC tag identifier may be over-written with a new NFC tag identifier, which comprises a new address for the remote control and the new NFC tag identifier may be locked.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for interrupt based NFC pairing.

Accordingly, aspects of the present disclosure may be realized in hardware, software, or a combination of hardware and software. Aspects of the present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method comprising:
responsive to one or both of a primary coil and a secondary coil of near-field communication tag of a first device being energized by a near-field communication reader of a second device:
generating an electrical signal in the secondary coil;
receiving, by a processor of the first device and from the secondary coil, the electrical signal;
responsive to receiving the electrical signal, generating, by the processor, an interrupt signal; and
responsive to generating the interrupt signal, initiating, by the first device, a Bluetooth pairing process with the second device.

2. The method of claim 1, wherein the near-field communication tag is a passive near-field communication tag.

3. The method of claim 1, further comprising:
transmitting, by the near-field communication tag and to the near-field communication reader, a near-field communication tag identifier, which comprises an address corresponding to the first device.

4. The method of claim 3, wherein receipt of the near-field communication tag identifier by the second device initiates the Bluetooth pairing process on the second device.

5. The method of claim 3, wherein the near-field communication tag identifier is utilized by the second device during the pairing process.

6. The method of claim 3, further comprising:
responsive to initiating the Bluetooth pairing process on the first device and on the second device, over-writing, by the second device, the near-field communication tag identifier with a new near-field communication tag identifier.

7. The method of claim 6, further comprising:
locking the new near-field communication tag identifier.

8. The method of claim 1, further comprising:
executing, by the processor and based on the interrupt signal, an interrupt service routine.

9. The method of claim 8, wherein the interrupt service routine initiates the Bluetooth pairing process on the first device.

10. The method of claim 1, further comprising:
prior to the processor receiving the electrical signal, filtering, by a filter of the first device, the electrical signal.

11. A system comprising:
a processor;
a wireless transceiver configured to exchange data to one or more devices using a Bluetooth protocol; and
a passive near-field communication tag, the passive near-field communication tag comprising:
a primary coil; and
a secondary coil coupled to the processor,
wherein the processor is configured to, responsive to an electrical signal being generated in the secondary coil when one or both of said primary coil and said secondary coil are energized by a near-field communication reader in a second device:

receive the electrical signal from the secondary coil;

generate, based on the electrical signal, an interrupt signal; and responsive to generating the interrupt signal, initiate, via the wireless transceiver, a Bluetooth pairing process with the second device.

12. The system of claim 11, further comprising:

a memory that stores a near-field communication tag identifier, which comprises an address corresponding to the first device, wherein near-field communication tag identifier is communicated from the near-field communication tag to the near-field communication reader.

13. The system of claim 12, wherein receipt of the near-field communication tag identifier by the second device initiates pairing on the second device.

14. The system according to claim 12, wherein the near-field communication tag identifier is utilized by the second device for pairing.

15. The system of claim 12, wherein, in response to initiating pairing on the first device and on the second device, the near-field communication tag identifier is overwritten by the second device with a new near-field communication tag identifier.

16. The system of claim 15, wherein the new near-field communication tag identifier is locked.

17. The system of claim 11, further comprising:

a filter coupled to and positioned between the secondary coil and the processor, wherein the filter filters the electrical signal.

* * * * *